United States Patent [19]

Wilson, Sr. et al.

[11] 4,174,604
[45] Nov. 20, 1979

[54] HEDGE TRIMMER APPARATUS

[76] Inventors: David J. Wilson, Sr., 207 N. Jefferson St., Athens, Ala. 35611; David J. Wilson, Jr., 2707 Churchill Dr., Huntsvlle, Ala. 35801

[21] Appl. No.: 943,699

[22] Filed: Sep. 19, 1978

Related U.S. Application Data

[63] Continuation-in-part of Ser. No. 789,968, Apr. 22, 1977, abandoned.

[51] Int. Cl.² ............................................ A01D 55/02
[52] U.S. Cl. ................................................... 56/237
[58] Field of Search ................................. 56/233–237

[56] References Cited

U.S. PATENT DOCUMENTS

| 1,262,393 | 4/1918 | Schaeffer | 56/237 |
| 2,926,480 | 3/1960 | Kimball | 56/237 |
| 3,961,468 | 6/1976 | Brown | 56/237 |

Primary Examiner—Jay N. Eskovitz
Attorney, Agent, or Firm—C. A. Phillips

[57] ABSTRACT

A mobile hedge trimming machine including a two-wheeled carriage which supports a generally vertical, movable and tiltable base assembly, which in turn supports a motor driven hedge trimmer. Angularly displaced from the vertically oriented base assembly is a control column upon which there is located a control handle assembly by which the carriage is moved along a hedge by an operator, and by which the hedge trimmer is oriented both in elevation and tilt.

4 Claims, 4 Drawing Figures

HEDGE TRIMMER APPARATUS

This application is a continuation-in-part of application Ser. No. 789,968, filed Apr. 22, 1977, now abandoned.

BACKGROUND OF THE INVENTION

1. Field of the Invention

This invention relates to a manually propelled, carriage supported, motorized hedge trimmer, and particularly to such an apparatus wherein the operator may readily adjust the trimmer height and level while pushing the carriage beside a hedge row.

2. General Description of the Prior Art

Although motorized hedge trimmers have greatly reduced the time and effort required to trim a hedge, hedge cutting is still considered a laborous, time-consuming task. Considerable physical effort is required to manually support the conventional motorized hedge trimmer. This is especially true for trimming relatively tall and/or wide hedges. For this reason, and because of increased labor costs, many hedges have recently been destroyed. Likewise, hedges are generally much less prevalent in new neighborhoods than in old ones.

Hedge trimmers have been the subject of inventions for many years. One of the earliest of these is reflected by U.S. Pat. No. 62,487, a horsedrawn device patented in 1867. It provides means for adjustment in height, but not in tilt. Since the terrain surrounding hedges is typically uneven, the top of the hedge trimmed by this device would likewise be uneven. The device also lacked the capability to trim the sides of a hedge.

U.S. Pat. No. 1,897,543, granted in 1933, was an improvement over the previous device is that it would be manually propelled and was less complex to manufacture. Although the device could be manually adjusted in height and tilt, this adjustment could not be made while simultaneously propelling the carriage. The operator was required to stop trimming, walk around to the support shaft, loosen set screws associated with the two independent adjustments, physically support the device in the new height and/or tilt position, and manually retighten he set screws. Since the trail around a hedge is typically very uneven, many, many such adjustments would be required in trimming a hedge row for a precise, even trim.

In 1956, U.S. Pat. No. 2,762,186 was issued for a motorized hedge trimmer with a "rollable base". The device was also adjustable in height and tilt, but only after ceasing to trim the hedge, removing a pair of screws in the frame supporting the trimmers, physically readjusting the trimmer, and manually replacing the screws.

More recent patents, U.S. Pat. Nos. 3,431,647 and 3,540,122, issued in 1966 and 1970, respectively, relate to a motorized hand-held trimmer and set of spirit levels for maintaining proper level while manually supporting the trimmers. Hand-held trimmers such as these are physically tiring to support at the proper height for accurate trimming of hedges of significant lengths.

U.S. Pat. No. 3,597,908, issued in 1971, relates to a tree-trimming (or hedge trimming) cutter mounted on a forklift tractor with hydraulic means for adjusting trimmer level and depending upon the forklift for adjusting trimmer height. Such an arrangement is simply too expensive to be marketable.

SUMMARY OF THE INVENTION

In accordance with this invention, there would be constructed a two-wheeled carriage which supports a generally vertical, movable and tiltable base assembly, which in turn supports a motor driven hedge trimmer. Angularly displaced from the orientable base assembly is a control column upon which there is located a control handle assembly by which both elevation and tilt of a hedge trimmer is effected and the carriage is moved along a hedge by an operator.

DETAILED DESCRIPTION OF THE DRAWINGS

Figure 1:
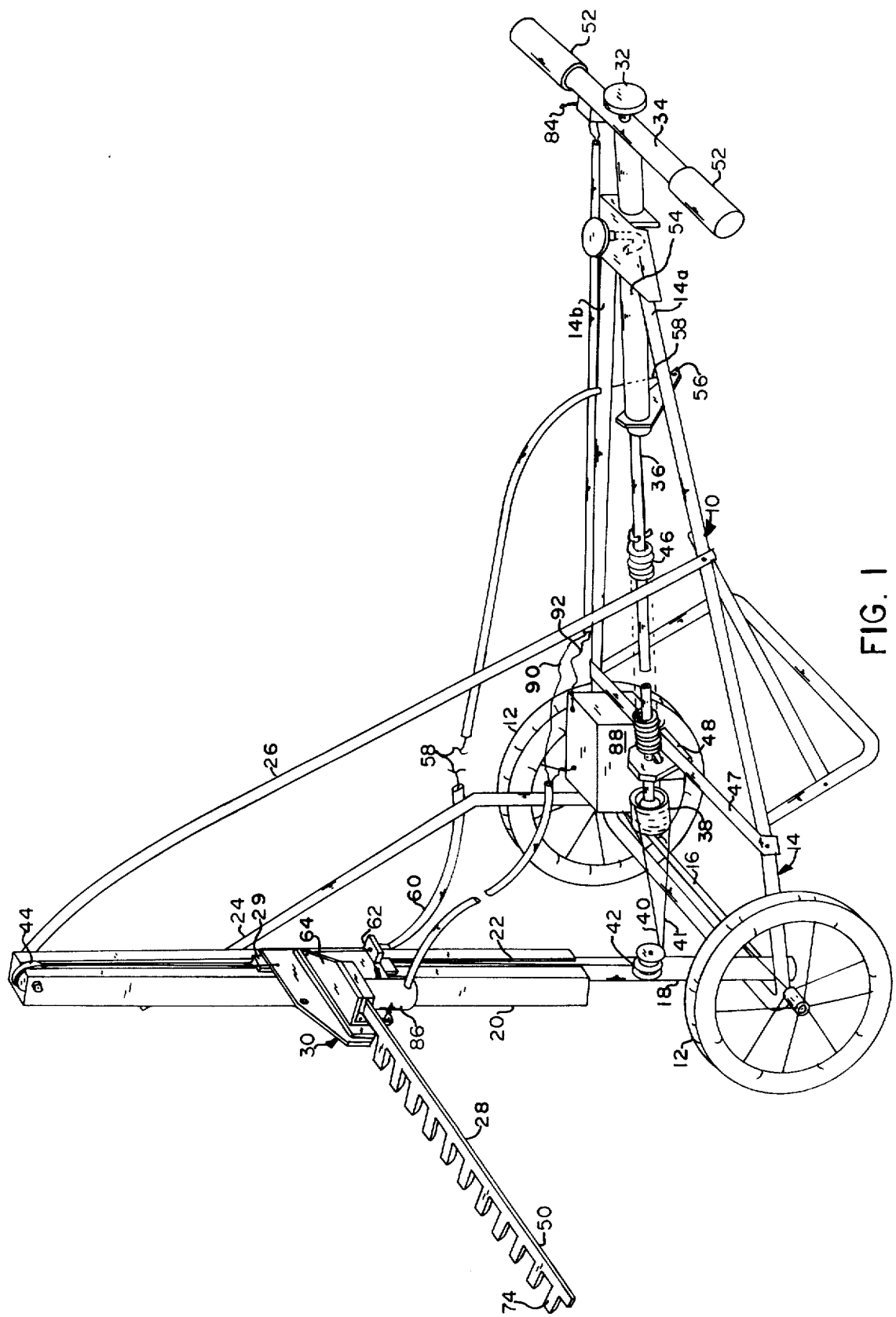
FIG. 1 is a perspective view of the hedge trimmer support carriage.
Figure 3:
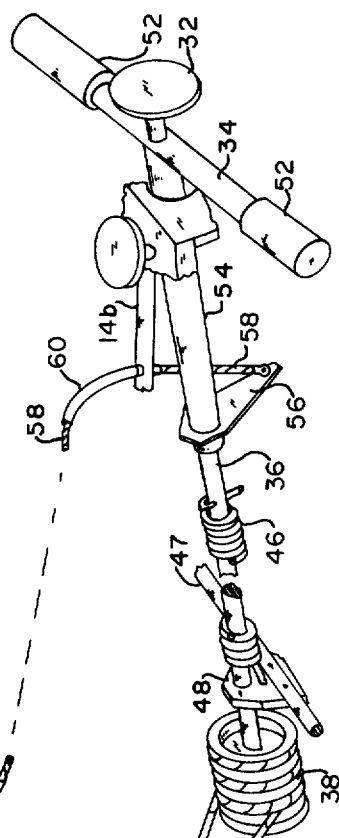
FIG. 3 is a perspective view of the trimmer tilt mechanism configured to trim the sides of the hedge.
Figure 3:
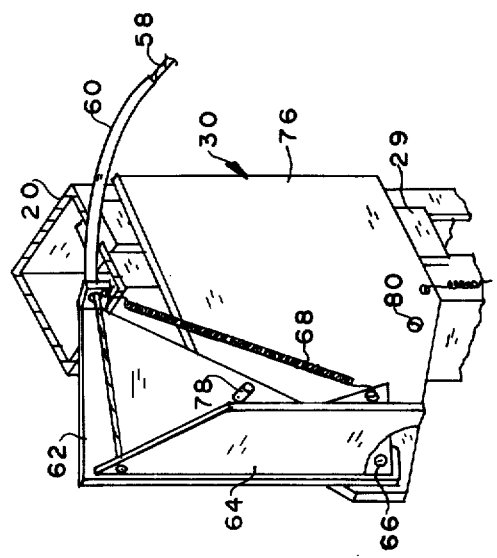
Figure 2:
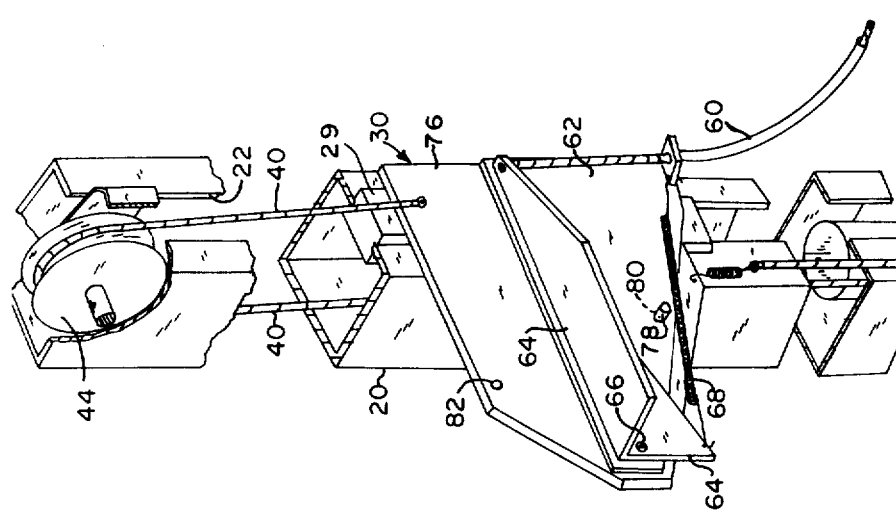
FIG. 2 is an enlarged fragmented view of major parts of the hedge trimmer.

Referring to FIGS. 1-3, hedge trimmer carriage 10 drives a pair of large diameter wheels 12 attached to a tubular frame 14 and located on opposite ends of an axle 16. Rising from axle 16 is a near vertical assembly consisting of a round tube 18 supporting a rectangular tube 20 with a slit 22 cut down one side. The rectangular tube 20 is further supported from carriage frame 14 by tubular members 24 and 26. Riding vertically in slit 22 of rectangular tube 20 is nylon slider 29 which is attached to platform assembly 30, which in turn supports hedge trimmer 28. The height of support platform 30 and trimmer 28 is adjusted by rotation of hand wheel 32 located on handle 34 of carriage 10. Clockwise rotation of wheel 32 causes rotation of attached shaft 36 and cable spool 38 and subsequent take-up of cable 40 and release of cable 41. Cable 40 traverses pulley 42, interior of tube 20 and pulley 44, and is attached to trimmer support platform 30. Thus, clockwise rotation of wheel 32 causes trimmer support platform 30 to traverse upwardly along slit 22 in tube 20. Counterclockwise rotation of hand crank 32 allows support platform 30 to drop downward along slit 22 of tube 20 while taking up cable 41 on spool 38. Upward movement of support platform 30 is assisted by torsion spring 46 stored around mandrel 36 and attached to tubular frame 47 at bracket 48.

Tilt adjustment of cutting surface 50 is achieved by rotation of handlebar 52 located on handle 34 of trimmer carriage 10. Clockwise rotation of handlebar 52 causes rotation of attached tubular shaft 54 and bracket 56 which is also attached to shaft 54. (Shaft 54 is coincentric about shaft 36.) Clockwise rotation of handlebar 52 thus causes bracket 56 to increase tension upon cable 58 which traverses conduit 60. Conduit 60 is securely attached to both carriage frame 14b and pivotal bracket 62. Thus, increased tension in cable 58 produces increased tension between trimmer mounting bracket 64 and pivotal bracket 62. This increased tension in turn causes mounting bracket 64 to rotate about pivotal pin 66 which connects brackets 62 and 64. When handlebar 52 is released, tension in spring 68 tends to return mounting bracket 64 to its original position. Thus, clockwise rotation of handlebar 52 causes rotation of mounting bracket 64 and attached hedge trimmer 28 about pivotal pin 66 such that tip 74 of cutting surface 50 of hedge trimmer 28 is raised. Likewise, release or counterclockwise rotation of handlebar 52 allows spring 68 to cause downward rotation of tip 74 of cutting surface 50.

Rotation of trimmer cutting surface 50 between horizontal positions for trimming hedge tops and vertical positions for trimming hedge sides is performed about pivotal pin 66, which connects plate 76 to pivotal bracket 62 and mounting bracket 64. Pivotal bracket 62 is held in place for horizontal hedge trimming by fastener 78 penetrating plate 76 through opening 80. For vertical hedge trimming, pivotal bracket 62 is fastened in place by fastener 78 penetrating plate 76 through opening 82. Plate 76 is secured to slider 29 for height adjustment of support plateform 30 and hedge trimmer 28 as described above.

Movement of the trimmer carriage along a hedge is performed by manually pushing carriage 10 at handlebar 52. Height and tilt adjustments of cutting surface 50 are performed simultaneously and independently while moving trimmer 28 along the hedge by rotation of hand crank 32 and handlebar 52.

In order to prevent operation in the event that the operator is not safely positioned with a hand or hands on handlebar 52, there would typically be included on handlebar 52 a cut-off switch 84 (FIG. 1) in circuit with engine or motor 86 and battery 88 through cables 90 and 92. Thus, when switch 84 is not gripped, there would be effected a turn-off of engine or motor 86.

Figure 4:
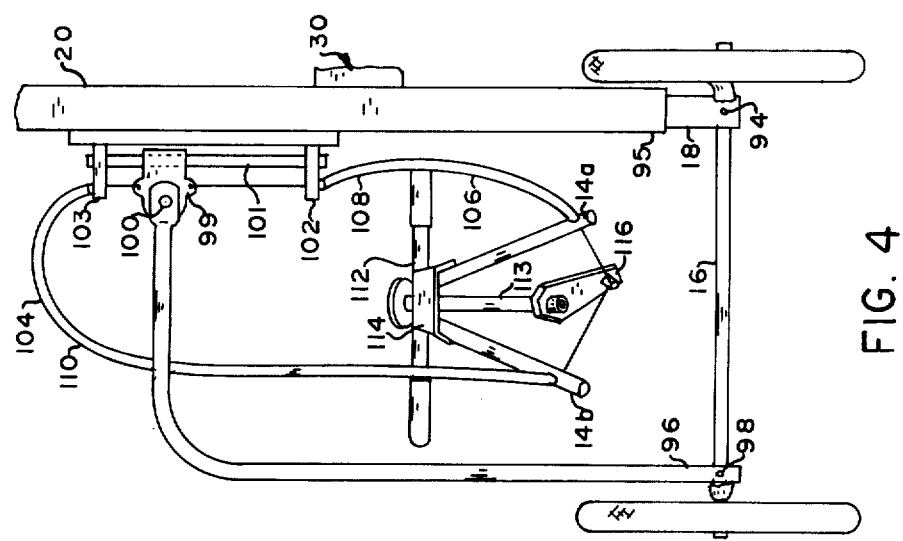
FIG. 4 is an elevational view of a portion of the frame of the trimmer and equipped with alternate means of tilting a blade assembly.

FIG. 4 illustrates an alternate arrangement for effecting tilt of platform 30. As shown, tube 18 is pivotable by pin 94 interconnecting tube 18 and axle 16, and frame member 96 is pivotable about pin 98 interconnecting axle 16 with frame member 96. Tilting is enabled by a collar 99, pivotally attached by pin 100 to frame member 96, which collar may vertically slide on column 101, supported by brackets 102 and 103 on rectangular tube 20. Tilt is controlled by control cables 104 and 106 which are attached to collar 99, these cables having a conventional sheath covering or housing. Housing 108 is locked at one end (by means not shown) to frame support 14a and at an opposite end to bracket 102, and housing 110 is locked at one end to frame support 14b and at the opposite end to bracket 103. A handle 112 is pivotally mounted by shaft 113 on bracket 114, connecting frame members 14a and 14b. Shaft 113 has a rigidly attached lever 116 which connects to ends of cables 104 and 106, whereby, by rotation of shaft 113 by handle 112, collar 99 is caused to move verticaly, in turn effecting a tilt of platform 30. The tilting means just described may be used in conjunction with the one illustrated in FIG. 1, whereby platform assembly 30 is tilted, or the latter mechanism may be dispensed with.

Having thus disclosed my invention, what is claimed is:

1. A carriage for a motorized hedge trimmer comprising:
   a rollable first frame adapted to move along the ground, and having a pair of spaced wheels journalled about an axis;
   a generally straight, elongated second frame supported by and rising from a point on said axle adjacent to one of said wheels, and including a generally vertically extending guide;
   a generally upward extending strut supported adjacent to the other of said wheels on said axle and connecting to an upper point on said second frame;
   an elevatable base supported by said second guide and adapted to be guided by said guide along said second frame;
   support means for supporting a motorized hedge trimmer on said base;
   tilt means for adjustably tilting said support means with respect to an axis which is normal to a plane parallel to the axis of said axle;
   an operating control assembly comprising:
      a triangular-shaped third frame coupled at its base to said axle and generally lying within a plane which is tilted with respect to said second frame from its base, base of third frame, to its apex,
      first control means supported at the apex of said first frame, including a first handle for providing, upon operation, a first bidirectional mechanical output, and
      second control means supported at the apex of said third frame, including a second handle for providing, upon operation, a second bidirectional mechanical output;
   elevation means responsive to a said first bi-directional output for elevating and lowering said base; and
   tilting means responsive to said second bi-directional output for tilting said support means with respect to a line parallel to said axle;
   whereby a motorized hedge trimmer attached to said support means may be selectively moved along a hedge and be selectively elevated and tilted.

2. A carriage for a motorized hedge trimmer as set forth in claim 1 further comprising switching means supported by said third frame, and including a hand grippable, normally open, electrical switch, whereby an electrically operated motorized hedge trimmer on said third frame, and connectible through said switch to a source of power, could be operated off in the event that one should release his grip on said switch.

3. A carriage for a motorized hedge trimmer as set forth in claim 1 wherein said support means comprises a second base pivotally attached to said first base, and said tilting means effects tilting of said second base with respect to said first base.

4. A carriage for a motorized hedge trimmer as set forth in claim 1 wherein said tilting means comprises means for varying the point of coupling of said strut to said second frame.

* * * * *